United States Patent [19]
Mayumi et al.

[11] Patent Number: 4,885,334
[45] Date of Patent: Dec. 5, 1989

[54] THERMOPLASTIC RESIN COMPOSITION

[75] Inventors: Junji Mayumi; Hiroshi Omori, both of Mie, Japan

[73] Assignee: Mitsubishi Petrochemical Co., Ltd., Tokyo, Japan

[21] Appl. No.: 120,836

[22] Filed: Nov. 16, 1987

[30] Foreign Application Priority Data

Nov. 19, 1986 [JP] Japan ................... 61-275697

[51] Int. Cl.$^4$ .................. C08L 51/04; C08L 71/04
[52] U.S. Cl. ......................... 525/66; 525/67; 525/68; 525/285; 525/905
[58] Field of Search ..................... 525/68, 66, 67

[56] References Cited

U.S. PATENT DOCUMENTS

| | | | |
|---|---|---|---|
| 4,309,514 | 6/1982 | Lee, Jr. ................. | 525/901 |
| 4,454,284 | 6/1984 | Ueno et al. ............ | 525/905 |
| 4,728,461 | 3/1988 | Fujii et al. ............. | 525/68 |
| 4,772,664 | 9/1988 | Ueda et al. ............ | 525/905 |

Primary Examiner—Jacob Ziegler
Attorney, Agent, or Firm—Oblon, Spivak, McClelland, Maier & Neustadt

[57] ABSTRACT

A thermoplastic resin composition is described, comprising (a) a polyphenylene ether resin, (b) a polar thermoplastic resin having a polar functional group, and (c) a modified block copolymer obtained by subjecting a hydrogenated block copolymer comprising an aromatic vinyl compound polymer block (A) and a conjugated diene compound polymer block (B) to graft polymerization in the presence of a monomer having an epoxy group. The resin composition is excellent in impact resistance, solvent resistance, and compatibility among the resinous components thereof.

21 Claims, No Drawings

THERMOPLASTIC RESIN COMPOSITION

FIELD OF THE INVENTION

This invention relates to a resin composition excellent in impact resistance and solvent resistance. More particularly, it relates to a resin composition comprising a polyphenylene ether resin, a polar thermoplastic resin, and a specific block copolymer, which has improved compatibility and thereby exhibits excellent impact resistance and solvent resistance.

BACKGROUND OF THE INVENTION

A polyphenylene ether resin is a useful high polymeric material because of its heat resistance, mechanical strength, and electrical characteristics. However, a polyphenylene ether resin is often found unsatisfactory in molding properties, solvent resistance, and impact resistance. In an attempt to compensate for these disadvantages, it has been proposed to blend a polyphenylene ether resin with other resins, such as polyester, polyamide, polyolefin, etc., but blending of these resins brings about unfavorable results, such as layer separation and reduction of mechanical strength due to poor compatibility between these resins and the polyphenylene ether resin.

It is well known to blend a styrene/butadiene block copolymer or a styrene/isoprene block copolymer or a hydrogenation product thereof in order to improve impact strength of a polyphenylene ether resin as described, e.g., in Japanese Laid-Open Patent Application No. 79151/81 and U.S. Pat. No. 4,309,514. This technique, however, still fails to compensate for the poor solvent resistance of the polyphenylene ether resin. It has also been proposed to blend a polyphenylene ether resin with the above-described block copolymer and a polar polymer, e.g., polyamide and polyester, but the resulting composition is still unsatisfactory due to poor compatibility between the block copolymer and the polar polymer.

SUMMARY OF THE INVENTION

The inventors have conducted extensive researches into thermoplastic resin compositions comprising a polyphenylene ether resin, a polar polymer, and a block copolymer and having improved compatibility among these resin components, which would lead to improvement in mechanical strength. As a result, it has now been found that the purpose can be accomplished by a thermoplastic resin composition comprising (a) a polyphenylene ether resin, (b) a polar thermoplastic resin having a polar functional group, and (c) a modified block copolymer obtained by subjecting a hydrogenated block copolymer comprising an aromatic vinyl compound polymer block (A) and a conjugated diene compound polymer block (B) to graft polymerization in the presence of a monomer having an epoxy group, the component (c) being present in an amount of from 5 to 50 parts by weight based on the total amount of the components (a) and (b).

DETAILED DESCRIPTION OF THE INVENTION

The polyphenylene ether resin which can be used as component (a) in the present invention includes polyphenylene ether resins obtained by polycondensation of one or more monocyclic phenols represented by the formula (I):

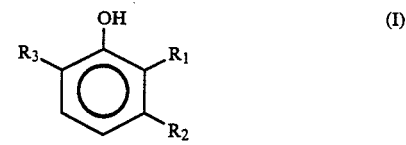

wherein $R_1$ represents a lower alkyl group having from 1 to 3 carbon atoms; and $R_2$ and $R_3$ each represents a hydrogen atom or a lower alkyl group having from 1 to 3 carbon atoms.

The polyphenylene ether resin embraces graft polymers obtained by grafting an aromatic vinyl compound to a polyphenylene ether resin. The polyphenylene ether resin may be either a homopolymer or a copolymer.

Specific examples of the monocyclic phenols represented by the formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, 2,3-dimethylphenol, 2,3-diethylphenol, 2,3-dipropylphenol, 2-methyl-3-ethyl-phenol, 2-methyl-3-propylphenol, 2-ethyl3-methylphenol, 2-ethyl-3-propylphenol, 2-propyl-3-methylphenol, 2-propyl-3-ethylphenol, 2,3,6-trimethylphenol, 2,3,6-tri-ethylphenol, 2,3,6-tripropylphenol, 2,6-di-methyl-3-ethylphenol, 2,6-dimethyl-3-propylphenol, etc. Specific examples of the polyphenylene ether resins obtained by polycondensation of one or more of these phenols are poly(2,6-dimethyl-1,4-phenylene)ether, poly(2,6-diethyl-1,4-phenylene)ether, poly(2-methyl-6-ethyl1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, a 2,6-dimethylphenol/2,3,6-trimethylphenol copolymer, a 2,6-dimethylphenol/2,3,6-triethylphenol copolymer, 2,6-diethylphenol/2,3,6-trimethylphenol copolymer, a 2,6-dipropylphenol/2,3,6-trimethylphenol copolymer, a graft polymer obtained by grafting styrene to poly(2,6-dimethyl-1,4phenylene)ether, a graft copolymer obtained by grafting styrene to a 2,6-dimethylphenol/2,3,6-trimethylphenol copolymer, etc.

The polyphenylene ether resin to be used in the present invention preferably has an intrinsic viscosity ranging from 0.15 to 0.70, and more preferably from 0.20 to 0.60, as measured in chloroform at 30° C.

The polyphenylene ether resin to be used may contain a styrene polymer. The styrene polymer to be added is known per se and includes a styrene homopolymer comprising a repeating structural unit derived from an aromatic vinyl compound and represented by the formula (II):

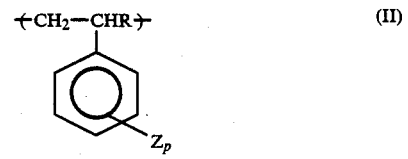

wherein R represents a hydrogen atom or an alkyl group having from 1 to 4 carbon atoms; Z represents a halogen atom or an alkyl group having from 1 to 4 carbon atoms; and p represents an integer of from 1 to 5, and a styrene copolymer comprising at least 50% by weight of the repeating structural unit represented by the formula (II). Examples of such a styrene polymer are polystyrene, polymethylstyrene, a styrene/acrylonitrile copolymer, rubber reinforced polystyrene (reinforced by polybutadiene, a styrene/butadiene copolymer, etc.), and the like.

These styrene polymers can be added to the polyphenylene ether resin in such an amount that does not impair characteristics of polyphenylene ether. A recommended amount of the styrene polymer ranges from 1 to 80 parts by weight per 100 parts by weight of the total amount of the polyphenylene ether resin and the styrene polymer.

The polar thermoplastic resin which can be used as component (b) has a polar functional group which is capable of chemically bonding with an epoxy group grafted to the modified block copolymer as component (c) hereinafter described or which exerts a strong interaction with the epoxy group. Such a functional group includes an amino group, a hydroxyl group, a carboxyl group or a salt form thereof, a carboxylic acid anhydride group, a mercapto group, and groups capable of easily forming the above-enumerated functional groups by heating or the like means, such as an urethane group, an ester group, an amido group, an ammonium salt, etc.

The polar thermoplastic resin having the aforesaid polar functional group includes (i) polyester, (ii) polyamide, (iii) copolymers comprising an olefin monomer and a vinyl monomer having the polar functional group, (iv) modified polyolefin modified with a vinyl monomer having the polar functional group, (v) polycarbonate, and the like. These polymer resins may have the polar functional group bonded to either the end or the side chain thereof.

The polyester (i) is a high-molecular weight thermoplastic resin having an ester linkage in the main chain thereof and includes a polycondensation product obtained from a dicarboxylic acid or its derivative and a dihydric alcohol or dihydric phenol compound, a polycondensation product obtained from a dicarboxylic acid or its derivative and a cyclic ether compound, a polycondensation product obtained from a dicarboxylic acid metal salt and a dihalogen compound, a ring opening polymerization product of a cyclic ester compound, and the like.

The dicarboxylic acid derivative as above referred to include acid anhydrides, esters and acid chlorides. The dicarboxylic acid includes aromatic dicarboxylic acids, e.g., terephthalic acid, isophthalic acid, phthalic acid, p-carboxyphenylacetic acid, etc.; and aliphatic dicarboxylic acids, e.g., oxalic acid, succinic acid, adipic acid, sebacic acid, maleic acid, fumaric acid, etc. Of these preferred are aromatic dicarboxylic acids, with terephthalic acid, isophthalic acid, and phthalic acid being more preferred.

The dihydric alcohol includes ethylene glycol, propylene glycol, trimethylene glycol, butane-1,3-diol, butane-1,4-diol, pentamethylene glycol, hexamethylene glycol, heptamethylene glycol, octamethylene glycol, etc. Preferred of these are ethylene glycol, propylene glycol, trimethylene glycol, butane-1,4-diol, and butane-1,3-diol, with ethylene glycol and butane-1,4-diol being more preferred. . The dihydric phenol compound includes hydroquinone, resorcinol, bisphenol A, etc.

The cyclic ether compound includes ethylene oxide, propylene oxide, etc. The cyclic ester compound includes δ-valerolactone, ε-caprolactone, etc. The dihalogen compound to be reacted with a dicarboxylic acid metal salt is a compound obtained by substituting two hydroxyl groups of the above-described dihydric alcohol or dihydric phenol compound with a halogen atom, e.g., chlorine, bromine, etc.

The polyester (i) to be used as the component (b) can be prepared from the above-described starting materials in a known manner, for example, by the processes disclosed in Japanese Patent Publication Nos. 13998/58 and 2594/59.

The molecular weight of the polyester is not particularly limited and, in general, polyester having an intrinsic viscosity of from 0.30 to 1.50 as measured in a 1:1 (by weight) mixed solvent of phenol and tetrachloroethane is used.

These polyesters may be used either individually or in combinations of two or more thereof.

The polyester further embraces known low crystalline polyester and polyether ester block copolymers having a hard segment and a soft segment in the same molecule thereof.

The polyamide (ii) which can be used as the component (b) includes a polycondensation product between a dicarboxylic acid and a diamine, a polycondensation product of an ω-aminocarboxylic acid, a ring opening polymerization product of a cyclic lactam. Specific examples of the polyamide are homopolymers, e.g., nylon-6, nylon-6,6, nylon-11, nylon-12, etc.; and copolymers, e.g., a nylon-6/nylon-6,6 copolymer, a nylon-6/nylon-12 copolymer, etc. Known non-crystalline nylon resins may also be employed. Among these polyamides, preferred are crystalline nylon, e.g., nylon-6, nylon-6,6, etc., and mixtures of crystalline nylon (e.g., nylon-6) and noncrystalline nylon.

In the copolymer (iii) comprising an olefin monomer and a vinyl monomer having a polar functional group which can be used as the component (b), the olefin monomer includes ethylene, propylene, butene-1, pentene-1, hexene-1, octene-1, 4-methylpentene-1, etc. The vinyl monomer having a polar functional group is not particularly restricted as long as the above-illustrated functional group is present therein. Specific examples of the vinyl monomer include unsaturated carboxylic acids and anhydrides thereof, e.g., acrylic acid, methacrylic acid, maleic acid, and anhydrides thereof; (meth)acrylates having a hydroxyl group, e.g., 2-hydroxyethyl (meth)acrylate, 2-hydroxypropyl (meth)acrylate, etc.; (meth)acrylates having an amino group, e.g., N,N-dimethyl-2aminoethyl (meth)acrylate, 2-aminoethyl (meth)acrylate, etc.; vinyl esters, e.g., vinyl acetate; alkyl (meth)acrylates, e.g., methyl (meth)acrylate; and the like. These olefin monomers and/or vinyl monomers may be used either individually or in combinations of two or more thereof.

Typical examples of the olefin/vinyl copolymer include an ethylene/(meth)acrylic acid copolymer, an ethylene/maleic anhydride copolymer, an ethylene/2-hydroxyethyl (meth)acrylate copolymer, an ethylene/vinyl acetate copolymer and a saponification product thereof, i.e., an ethylene/vinyl alcohol copolymer, an ethylene/propylene/(meth)acrylic acid copolymer, an ethylene/propylene/maleic anhydride copolymer, etc.

The modified polyolefin (iv) which can be used as the component (b) is generally obtained by graft polymerizing the above-described vinyl monomer having a polar functional group to polyolefin. The polyolefin is obtained by polymerizing one or more of the abovedescribed olefin monomers and includes homopolymers, e.g., polyethylene, polypropylene, polybutene-1, etc., and copolymers, e.g., an ethylene/propylene copolymer, an ethylene/propylene/butene-1 copolymer, a propylene/butene-1 copolymer, etc.

Graft polymerization of the polar functional group-containing vinyl monomer to the polyolefin can be carried out by generally known methods, in which polymerization is effected in a dissolved or molten state in the presence or absence of a radical initator.

Typical examples of the moldified polyolefin obtained by graft polymerization include maleic anhydridegrafted polypropylene, a maleic anhydride-grafted ethylene/propylene copolymer, (meth)acrylic acid-grafted polypropylene, a (meth)acrylic acid-grafted ethylene/propylene copolymer, 2-hydroxyethyl (meth)acryate-grafted polypropylene, a 2-hydroxyethyl (meth)acrylate-grafted ethylene/propylene copolymer, etc.

If desired, the modified polyolefin may be diluted with unmodified polyolefin upon use.

The polycarbonate (v) which can also be used as the component (b) is a polymer having a repeating structural unit represented by the formula (III):

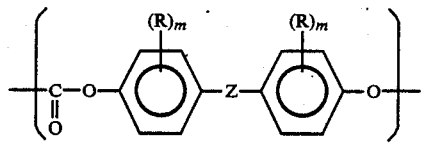
(III)

wherein Z represents a mere bond, an alkylene group having from 1 to 8 carbon atoms, an alkylidene group having from to 8 carbon atoms, a cycloalkylene group having from 5 to 15 carbon atoms, a cycloalkylidene group having from 5 to 15 carbon atoms, $-SO_2-$, $-SO-$, $-O-$, $-CO-$, or a group of formula

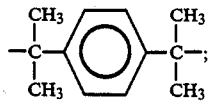

R represents a hydrogen atom, a chlorine atom, a bromine atom, or a saturated alkyl group having from 1 to 8 carbon atoms; and m represents 0 or an integer of from 1 to 4.

The polycarbonate can be obtained by known processes, for example, by reaction between a dihydric phenol and a carbonate precursor (e.g., phosgene) in a solvent (e.g., methylene chloride) in the presence of an acid acceptor and a molecular weight regulator, or by interesterification between a trihydric phenol and a carbonate precursor (e.g., diphenyl carbonate).

The dihydric phenol to be used includes bisphenols, and particularly preferably 2,2-bis(4-hydroxyphenyl)-propane (i.e., bisphenol A). A part or the whole of bisphenol A may be replaced with other dihydric phenols. The dihydric phenol other than bisphenol A includes hydroquinone, 4,4'-hydroxydiphenyl, bis(4hydroxyphenyl) cycloalkanes, etc. Homo- or copolymers of these dihydric phenols or mixtures of these polymers may also be employed. Further, random branched polycarbonate obtained by reacting a polyfunctional aromatic compound with a dihydric phenol and/or a carbonate precursor may also be used.

The above-described polar thermoplastic resins may be used either individually or in combinations of two or more thereof.

The polar thermoplastic resin as component (b) is present in an amount of from 10 to 95% by weight, preferably from 20 to 90% by weight, and more preferably from 25 to 85% by weight, based on the total amount of the components (a) and (b).

The modified block copolymer which can be used as component (c) in the present invention is obtained by graft polymerization of a monomer having an epoxy group to a hydrogenation product of a block copolymer comprising an aromatic vinyl compound polymer block (A) and a conjugated diene compound polymer block (B), in which the aliphatic unsaturated groups of the block (B) are reduced or abolished through hydrogenation. The blocks (A) and (B) may be arranged in a linear structure or a branched structure, a so-called radical tereblock structure. These block structures may partly contain a random chain derived from a random copolymer of the aromatic vinyl compound and the conjugated diene compound. Of these structures, the linear structure is preferred.

The aromatic vinyl compound constituting the block (A) is generally represented by the formula (IV):

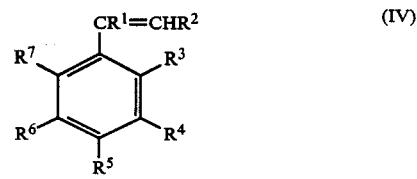
(IV)

wherein $R^1$ and $R^2$ each represents a hydrogen atom or a lower alkyl or alkenyl group having from 1 to 6 carbon atoms; $R^3$ and $R^4$ each represents a hydrogen atom, a lower alkyl group having from 1 to 6 carbon atoms, a chlorine atom, or a bromine atom; and $R^5$, $R^6$, and $R^7$ each represents a hydrogen atom or a lower alkyl or alkenyl group having from 1 to 6 carbon atoms, or $R^6$ and $R^7$ are taken together with the hydrocarbil group to form a naphthyl group.

Specific examples of the aromatic vinyl compound of the formula IV) are styrene, p-methylstyrene, α-methylstyrene, vinylxylene, vinyltoluene, vinylnaphthalene, divinylbenzene, bromostyrene, and chlorostyrene, with styrene, α-methylstyrene, p-methylstyrene, vinyltoluene, and vinylxylene being preferred. The most preferred of these is styrene.

Specific examples of the conjugated diene compound constituting the block (B) include 1,3-butadiene, 2-methyl-3-butadiene, 2,3-dimethyl-1,3-butadiene, 1,3-pentadiene, etc., with 1,3-butadiene and 2-methyl-1,3-butadiene being preferred.

In addition to the conjugated diene compound, the block (B) may further contain small amounts of lower olefinic hydrocarbons, e.g., ethylene, propylene, 1-butene, etc., cyclopentadiene, or non-conjugated dienes.

The hydrogenated aromatic vinyl compound/conjugated diene compound block copolymer preferably contains the repeating unit derived from the aromatic vinyl compound in a proportion ranging from 10 to 80% by weight, and more preferably from 15 to 60% by weight.

In the aliphatic chain of the hydrogenated block copolymer, the degree of unsaturation of the block (B) derived from the conjugated diene compound is preferably reduced by hydrogenation to 20% or less, and more preferably 10% or less, of the initial degree before hydro-genation. Further, up to about 25% of the aromatic unsaturated bonds derived from the aromatic vinyl compound remain in the block (A) may be hydrogenated.

The hydrogenated block copolymer preferably has a toluene solution viscosity at 25° C., a measure for molecular weight, in the range of from 30 to 3,000 cps at a concentration of 15% by weight or from 50 to 10,000 cps at a concentration of 20% by weight. If the viscosity is greater than the above range, the resulting resin composition would have insufficient molding properties. If it is smaller than that, the mechanical strength level of the resin composition would be unfavorably low.

Many processes for preparing the aromatic vinyl compound/conjugated diene compound block copolymer have been proposed. Typical processes are described, e.g., in Japanese Patent Publication No. 23798/65 and U.S. Pat. Nos. 3,595,942, and 4,090,996, in which block copolymerization is effected in an inert solvent in the presence of a lithium catalyst or a Ziegler-type catalyst.

Hydrogenation of the block copolymer can be carried out in an inert solvent in the presence of a catalyst for hydrogenation as taught, e.g., in Japanese Patent Publication Nos. 8704/67, 6636/68, and 20814/71. According to this process, preferably at least 80%, and more preferably at least 90%, of the olefinic double bonds in the block (B) are hydrogenated, with not more than about 25% of the aromatic unsaturated bonds in the block (A) being hydrogenated concomitantly.

These hydrogenated block copolymers are commercially sold by Shell Chemical Co. under a series of trade names of "Kraton G", e.g., "Kraton GX-1701" and "Kraton G-1652".

The monomer having an epoxy group which is graft polymerized to the hydrogenated block copolymer includes glycidyl (meth)acrylate, allyl glycidyl ether, glycidyl pvinylbenzoate, N-(p-vinylphenyl)glycidylurethane, methylglycidyl itaconate, glycidyl ethylmaleate, glycidyl ethylfumarate, butylglycidyl maleate, butylglycidyl fumarate, glycidyl 8-vinylacrylate, glycidyl sorbate, glycidyl vinylsulfonate, glycidyl allylsulfonate, etc.

These epoxy-containing monomers may be used in combinations thereof or in combination with other vinyl monomers, e.g., styrene, acrylonitrile, acrylamide, (meth)acrylic esters, etc.

Graft polymerization of the above-described epoxy containing monomer to the hydrogenated block copolymer can be carried out by known methods, such as a method in which the materials are melt-kneaded in an extruder in the presence or absence of a radical polymerization initiator to effect radical polymerization, a method in which the hydrogenated block copolymer is dissolved in an aromatic hydrocarbon solvent (e.g., toluene, xylene, chlorobenzene, benzene, etc.) having dissolved therein a radical polymerization initiator and the epoxy-containing monomer is fed to the solution, followed by heating to cause radical polymerization, a suspension grafting method as described in Japanese Laid-Open Patent Application No. 32990/77 in which a powder of the hydrogenated block copolymer is impregnated with the epoxy-containing monomer and radical polymerization is induced in an aqueous suspension, a radiation grafting method, and the like.

If desired, the thus obtained modified block copolymer may be washed with acetone, etc. to remove any non-grafted homopolymer of the epoxy-containing monomer or copolymer of the epoxy-containing monomer and other vinyl monomer. Further, the modified block copolymer may be diluted with unmodified block copolymer, if necessary.

The preferable epoxy value of the modified block copolymer is from 0.007 to 0.35, and more preferably from 0.01 to 0.2. (The epoxy value is the amount of the epoxy group

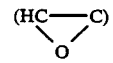

by mol per 100 g of modified block copolymer.)

If the epoxy value is less than 0.007, such a modified block copolymer has poor compatibility with the polar thermoplastic resin. On the other hand, if the epoxy value is more than 0.35, the modified block copolymer is apt to form a gel.

The modified block copolymer as component (c) is preferably present in the resin composition in an amount of from 5 to 50 parts by weight, and more preferably from 10 to 30 parts by weight, per 100 parts by weight of the total amount of the components (a) and (b). Amounts less than 5 parts by weight are not enough to improve impact resistance, and amounts exceeding 50 parts by weight deteriotrate solvent resistance.

In addition to the above-described essential components, the resin composition of the present invention may further contain, if desired, various additives as far as the effects of the present invention should not be impaired. Such additives include antioxidants, weathering agents, nucleating agents for polyolefins, slip agents, organic or inorganic fillers, flame retardars, various colorants, antistatics, parting agents, and the like. In particular, fillers, e.g., glass fiber, wollastonite, potassium titanate whiskers, mica, talc, calcium carbonate, etc., are effective to improve a balance of physical properties, such as stiffness, etc., molding properties, dimensional accuracy, dimensional stability, and the like.

The resin composition according to the present invention can be obtained by blending the aforesaid components by various methods commonly employed for blending resinous components or compounding additives, such as stabilizers, colorants, and fillers, into resinous components. For example, the components in the form of a powder or granule are uniformly dispersed in a Henschel mixer, a super mixer, a ribbon blender, a twin-shell blender, etc., and the resulting blend is melt-kneaded in a twin screw extruder, a single screw extruder, a roll, a Banbury mixer, a plastomill, a Brabender Plastograph, etc. at a temperature usually ranging from 200° C. to 35° C. The resulting resin composition may be pelletized.

The resin composition according to the present invention can be molded easily by the molding methods commonly applied to thermoplastic resins, such as injection molding, extrusion molding, blow molding, and the like, with injection molding being preferred.

As being excellent in mechanical properties, the resin composition of the invention is suitable for use as automobile parts, such as exterior parts, e.g., bampers, door panels, fenders, moldings, emblems, wheel covers, engine hoods, roofs, spoilers, etc., and interior parts, e.g., instrument panels, console boxes, trims, etc.; exterior parts of appliances, e.g., TV sets, refrigerators, etc.; and parts of so-called office automation equipments.

The present invention will now be illustrated in greater detail with reference to Reference Examples, Examples, and Comparative Examples, but the present invention should not be construed as being limited thereto. In these examples, all the parts and percents are by weight unless otherwise indicated.

REFERENCE EXAMPLE 1

In a 10 l-volume flask were charged 4 l of pure water, and a suspending agent (120 g of calcium tertiary phosphate, and 0.12 g of sodium dodecylbenzenesulfonate) and 1.5 kg of a powder of a hydrogenated aromatic vinyl compound/conjugated diene compound block copolymer ("Kraton G-1652" produced by Shell Chemical Co.) were added to the mixture, followed by stirring to obtain a suspension. To the suspension were added 5 g of t-butyl peroxypivalate (produced by Nippon Oils & Fats Co., Ltd.), 2.5 g of benzoyl peroxide, 100 g of glycidyl methacrylate, and 400 g of styrene. The system was heated up to 50° C. while stirring, and stirring was continued at that temperature for 3 hours to thereby impregnate the monomers and the initiator into the hydrogenated block copolymer particles. The suspension was heated to 75° C. and kept at that temperature for 2 hours under stirring to effect polymerization and then at 90° C. for an additional 3 hours under stirring to complete the polymerization. After cooling, the solid was collected by filtration, washed with water, and dried to obtain a modified block copolymer (designated as A). Infrared absorption analysis revealed that the modified block copolymer A ha a polyglycidyl methacrylate content of 4.5%, which corresponded to an epoxy value of 0.03.

REFERENCE EXAMPLE 2

A modified block copolymer B was prepared in the same manner as in Reference Example 1, except for changing the amounts of Kraton G-1652, glycidyl methacrylate, styrene, t-butyl peroxypivalate, and benzoyl peroxide to 1 kg, 100 g, 900 g, 10 g and 5.0 g, respectively. The polyglycidyl methacrylate content and the epoxy value of the product were found by IR analysis to be 4.6% and 0.03, respectively.

REFERENCE EXAMPLE 3

A modified block copolymer C was prepared in the same manner as in Reference Example 1, except for replacing Kraton G-1652 with Kraton GX-1701 (produced by Shell Chemical Co.). The polyglycidyl methacrylate content and the epoxy value of the product were found by IR analysis to be 4.5% and 0.03, respectively.

REFERENCE EXAMPLE 4

A hundred parts of Kraton G-1652, 30 parts of glycidyl methacrylate, and 400 parts of xylene were charged in a reactor equipped with a reflux condenser. The mixture was heated at 110° C. to form a solution, and 5 parts of benzoyl peroxide was added thereto over a period of 6 hours. After the addition, the system was stirred at that temperature for 3 hours to effect reaction. After completion of the reaction, the reaction system was cooled to around room temperature, and acetone was added thereto, followed by filteration to collect the precipitated block copolymer to which glycidyl methacrylate was grafted. The precipitate was repeatedly washed with acetone, and the washed precipitate was dried under reduced pressure while elevating the temperature to obtain a modified resin as a white powder. As a result of IR analysis, the resulting modified resin was found to have a polyglycidyl methacrylate content and an epoxy value of 2.5% and 0.02, respectively. This modified resin was designated as modified block copolymer D.

REFERENCE EXAMPLE 5

A modified block copolymer E was prepared in the same manner as in Reference Example 4, except for replacing Kraton G-1652 with Kraton GX-1701. The resulting product was found by IR analysis to have a polyglycidyl methacrtylate content and an epoxy value of 2.0% and 0.013, respectively.

REFERENCE EXAMPLE 6

Preparation of Modified Polyolefin as Component (b)

A hundred parts of polypropylene ("Mitsubishi POLYPRO BC8D" produced by Mitsubishi Petrochemical Co., Ltd.), 20 parts of maleic anhydride, and 300 parts of chlorobenzene were mixed, followed by heating at 140° C. to form a solution. To the solution was added 10 parts of dicumyl peroxide over a period of 6 hours, and the mixture was allowed to react at that temperature for 3 hours. A large excess of acetone was added to the reaction mixture to precipitate the produced polymer, which was then collected by filtration and dried to obtain maleic anhydride-grafted polypropylene (designated as F). The product was found to contain 8.3% of maleic anhydride by IR analysis.

EXAMPLES 1 TO 12 AND COMPARATIVE EXAMPLES 1 TO 7

Prescribed amounts of poly(2,6-dimethylphenylene)ether (prepared by Mitsubishi Petrochemical Co., Ltd.) having an intrinsic viscosity of 0.33 as measured in chloroform at 30° C., a polyester ("UNIPET RT-523CN", a trade name of polyethylene terephthalate produced by Nippon Unipet Co., Ltd.) as a polar thermoplastic resin, and each of the modified block copolymers A to E prepared in Reference Examples 1 to 5 were dried at 120° C. in a hot air drier for 5 hours and melt-kneaded at 280° C. for 5 minutes in a laboplastomill (manufactured by Toyo Seiki Co.) to prepare a resin composition. The compounding ratios are shown in Table 1.

In Comparative Examples 4 to 6, the modified block copolymer was replaced with unmodified block copolymer "Kraton G-1652".

EXAMPLES 13 TO 17 AND COMPARATIVE EXAMPLES 8 TO 10

A resin composition was prepared in the same manner as in Examples 1 to 12 or Comparative Examples 1 to 7, except for using a polyamide resin ("LUTRAMID", a trade name of nylon-6,6 produced by BASF AG; injection grade) as a polar thermoplastic resin. The compounding ratios are shown in Table 2.

EXAMPLES 18 TO 26 AND COMPARATIVE EXAMPLES 11 TO 14

A resin composition was prepared in the same manner as in Examples 1 to 12 or Comparative Examples 1 to 7, except for replacing the polyester with the modified polyolefin F as prepared in Reference Example 6 or an ethylene/acrylic acid copolymer ("Mitsubishi POLYETHYLENE X-190" produced by Mitsubishi Petrochemical Co., Ltd.; acrylic acid content: 6.6%; abbreviated as EAA). The compounding ratios are shown in Table 3. In Example 21, the resin composition further contained unmodified polypropylene ("Mitsubishi POLYPRO BC8D" produced by Mitsubishi petrochemical Co., Ltd., abbreviated as PP). In Comparative Example 12, the modified block copolymer was replaced with unmodified block copolymer "Kraton G-1652".

EXAMPLES 27 TO 34 AND COMPARATIVE EXAMPLES 15 TO 17

A resin composition was prepared in the same manner as in Examples 1 to 12 or Comparative Examples 1 to 7, except for replacing the polyester with a polycarbonate resin ("IUPILON S-2000" produced by Mitsubishi Gas Chemical Ind., Ltd.) or a combination of IUPILON S-2000 and a modified polyolefin (F or EAA). The compounding ratios are shown in Table 4. In Example 34, the resin composition further contained polystyrene ("HF-77" produced by Mitsubishi Monsanto Chemical Co., Ltd.) in combination with the polyphenylene ether (polystyrene/polyphenylene ether weight ratio =10:40).

Each of the resin compositions obtained in Examples 1 to 34 and Comparative Examples 1 to 17 was compression molded at 280° C. to prepare a 2 mm thick sheet. Physical properties of the resulting specimen were determined or evaluated according to the following test methods. The results obtained are shown in Tables 1 to 4.

(1) Dynstat Impact Strength:
Measured in accordance with BS-1330-1946 (measurement temperature: 23° C.).

(2) Solvent Resistance:
Measured in accordance with a Bergen's 1/4 ellipse method [cf. SPE Journal, 667 (1962)]. Specifically, a 2 mm thick specimen was fixed to a 1/4 elliptical support (major axis: 24 cm; minor axis: 8 cm) and dipped in commercially available gasoline for 5 minutes. The minimum strain at which a crack was initiated (threshold cracking strain) was measured and rated as follows.
Good No crack was generated.
Acceptable The threshold cracking strain was 1.0% or more.
Poor The threshold cracking strain was less than 1.0%

(3) Lamellar Separation:
In order to evaluate compatibility of a resin composition among the resinous components thereof, a compression molded specimen was ruptured by bending to visually observe whether the specimen underwent lamellar separation. The specimen whose surface was separated as thin layer or whose fracture surface had a form of tiers was judged to have undergone lamellar separation.

TABLE 1

| Example No. | Composition (part by weight) | | | | | | Dynstat Impact Strength (kg.cm/cm²) | Solvent Resistance | Lamellar Separation |
|---|---|---|---|---|---|---|---|---|---|
| | Polyphenylene Ether | Polyester | Modified Block Copolymer Kind | Amount | Other Kind | Amount | | | |
| 1 | 70 | 30 | A | 20 | | | >20 (nonfailure) | good | not observed |
| 2 | 50 | 50 | A | 20 | | | >20 (nonfailure) | " | not observed |
| 3 | 30 | 70 | A | 20 | | | >20 (nonfailure) | " | not observed |
| 4 | 50 | 50 | B | 20 | | | 20 (nonfailure) | " | not observed |
| 5 | 30 | 70 | B | 20 | | | >20 (nonfailure) | " | not observed |
| 6 | 50 | 50 | C | 20 | | | >20 (nonfailure) | " | not observed |
| 7 | 30 | 70 | C | 20 | | | >20 (nonfailure) | " | not observed |
| 8 | 70 | 30 | D | 20 | | | >20 (nonfailure) | " | not observed |
| 9 | 50 | 50 | D | 20 | | | >20 (nonfailure) | " | not observed |
| 10 | 30 | 70 | D | 20 | | | >20 (nonfailure) | " | not observed |
| 11 | 50 | 50 | E | 20 | | | >20 (nonfailure) | " | not observed |
| 12 | 30 | 70 | E | 20 | | | >20 (nonfailure) | " | not observed |
| Comparative Example 1 | 70 | 30 | | 0 | | | 1.5 | poor | observed |
| 2 | 50 | 50 | | 0 | | | 1.7 | acceptable | " |
| 3 | 30 | 70 | | 0 | | | 1.4 | " | " |
| 4 | 70 | 30 | | 0 | Kraton G-1652 | 20 | 10.2 | " | not observed |
| 5 | 50 | 50 | | 0 | Kraton G-1652 | 20 | 10.4 | " | not observed |
| 6 | 30 | 70 | | 0 | Kraton G-1652 | 20 | 11.5 | good | not observed |
| 7 | 100 | 0 | A | 20 | | | >20 | poor | not |

TABLE 1-continued

| | Composition (part by weight) | | | | | Dynstat | | |
|---|---|---|---|---|---|---|---|---|
| Example No. | Poly- phenylene Ether | Poly- ester | Modified Block Copolymer | | Other | | Impact Strength (kg.cm/cm²) | Solvent Resistance | Lamellar Separation |
| | | | Kind | Amount | Kind | Amount | | | |
| | | | | | | | (nonfailure) | | observed |

TABLE 2

| Example No. | Poly- phenylene Ether | Poly- amide | Modified Block Copolymer Kind | Amount | Other Kind | Amount | Dynstat Impact Strength (kg.cm/cm²) | Solvent Resistance | Lamellar Separation |
|---|---|---|---|---|---|---|---|---|---|
| 13 | 50 | 50 | A | 20 | | | >20 (nonfailure) | good | not observed |
| 14 | 50 | 50 | B | 20 | | | >20 (nonfailure) | " | not observed |
| 15 | 50 | 50 | C | 20 | | | >20 (nonfailure) | " | not observed |
| 16 | 50 | 50 | D | 20 | | | >20 (nonfailure) | " | not observed |
| 17 | 50 | 50 | E | 20 | | | >20 (nonfailure) | " | not observed |
| Comparative Example 8 | 50 | 50 | | 0 | | | 1.8 | good | observed |
| 9 | 50 | 50 | | 0 | Kraton G-1652 | 20 | 10.1 | " | " |
| 10 | 100 | 0 | A | 20 | | | >20 (nonfailure) | poor | not observed |

TABLE 3

| Example No. | Poly- phenylene Ether | Modified Polyolefin Kind | Amount | Modified Block Copolymer Kind | Amount | Other Kind | Amount | Dynstat Impact Strength (kg.cm/cm²) | Solvent Resistance | Lamellar Separation |
|---|---|---|---|---|---|---|---|---|---|---|
| 18 | 70 | F | 30 | A | 20 | | | >20 (nonfailure) | good | not observed |
| 19 | 50 | F | 50 | A | 20 | | | >20 (nonfailure) | good | not observed |
| 20 | 30 | F | 70 | A | 20 | | | >20 (nonfailure) | " | not observed |
| 21 | 30 | F | 30 | A | 20 | PP | 40 | >20 (nonfailure) | " | not observed |
| 22 | 50 | F | 50 | B | 20 | | | >20 (nonfailure) | " | not observed |
| 23 | 50 | F | 50 | C | 20 | | | >20 (nonfailure) | " | not observed |
| 24 | 50 | F | 50 | D | 20 | | | >20 (nonfailure) | " | not observed |
| 25 | 50 | F | 50 | E | 20 | | | >20 (nonfailure) | " | not observed |
| 26 | 70 | EAA | 30 | A | 20 | | | >20 (nonfailure) | " | not observed |
| Comparative Example 11 | 50 | F | 50 | | 0 | | | 2.3 | acceptable | observed |
| 12 | 50 | F | 50 | | 0 | Kraton G-1652 | 20 | 16.2 | " | not observed |
| 13 | 100 | | 0 | A | 20 | | | >20 (nonfailure) | poor | not observed |
| 14 | 70 | EAA | 30 | | 0 | | | 5.6 | acceptable | observed |

TABLE 4

| Example No. | Poly- phenylene Ether | Poly- carbonate | Modified Polyolefin Kind | Amount | Modified Block Copolymer Kind | Amount | Other Kind | Amount | Dynstat Impact Strength (kg.cm/cm²) | Solvent Resistance | Lamellar Separation |
|---|---|---|---|---|---|---|---|---|---|---|---|
| 27 | 50 | 50 | | 0 | A | 20 | | | >20 (nonfailure) | acceptable | not observed |
| 28 | 50 | 30 | F | 20 | A | 20 | | | >20 (nonfailure) | good | not observed |
| 29 | 50 | 30 | EAA | 20 | A | 20 | | | >20 (nonfailure) | " | not observed |
| 30 | 50 | 30 | F | 20 | B | 20 | | | >20 (nonfailure) | " | not observed |

TABLE 4-continued

| Example No. | Composition (part by weight) | | | | | | | | Dynstat Impact Strength (kg.cm/cm²) | Solvent Resistance | Lamellar Separation |
|---|---|---|---|---|---|---|---|---|---|---|---|
| | Polyphenylene Ether | Polycarbonate | Modified Polyolefin | | Modified Block Copolymer | | Other | | | | |
| | | | Kind | Amount | Kind | Amount | Kind | Amount | | | |
| 31 | 50 | 30 | F | 20 | C | 20 | | | >20 (nonfailure) | " | not observed |
| 32 | 50 | 30 | F | 20 | D | 20 | | | >20 (nonfailure) | " | not observed |
| 33 | 50 | 30 | F | 20 | E | 20 | | | >20 (nonfailure) | " | not observed |
| 34 | 40 | 30 | F | 20 | D | 20 | HF-77 | 10 | >20 (nonfailure) | " | not observed |
| Comparative Example 15 | 50 | 30 | F | 20 | | | | | 1.0 | acceptable | observed |
| 16 | 50 | 30 | F | 20 | | | Kraton G-1652 | 20 | 9.8 | " | not observed |
| 17 | 50 | 50 | | 0 | | | | | 1.3 | poor | observed |

It is apparent from Tables 1 to 4 that the resin compositions in accordance with the present invention which comprises a polyphenylene ether resin, a polar thermoplastic resin containing a polar functional group, and a modified block copolymer are markedly superior in impact resistance, solvent resistance, and compatibility among resinous components thereof as compared with resin compositions containing no modified block copolymer or resin compositions containing unmodified block copolymer in place of the modified block copolymer.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising (a) a polyphenylene ether resin, (b) a polar thermoplastic resin having a polar functional group, and (c) a modified block copolymer obtained by subjecting a hydrogenated block copolymer comprising an aromatic vinyl compound polymer block (A) and a conjugated diene compound polymer block (B) to graft polymerization in the presence of a monomer having an epoxy group.

2. A thermoplastic resin composition as claimed in claim 1, wherein from 1 to 80% by weight of said polyphenylene ether resin is replaced with a styrene polymer.

3. A thermoplastic resin composition as claimed in claim 1, wherein said polar thermoplastic resin is selected from the group consisting of polyester, polyamide, copolymers comprising an olefin monomer and a vinyl monomer having a polar functional group, modified polyolefin modified with a vinyl monomer having a polar functional group, and polycarbonate.

4. A thermoplastic resin composition as claimed in claim 1, wherein said aromatic vinyl compound is styrene, α-methylstyrene, p-methylstyrene, vinyltoluene, or vinylxylene.

5. A thermoplastic resin composition as claimed in claim 1, wherein said aromatic vinyl compound is styrene.

6. A thermoplastic resin composition as claimed in claim 1, wherein said conjugated diene compound is 1,3butadiene or 2-methyl-1,3-butadiene.

7. A thermoplastic resin composition as claimed in claim 1, wherein said hydrogenated block copolymer contains from 10 to 80% by weight of a repeating unit derived from the aromatic vinyl compound.

8. A thermoplastic resin composition as claimed in claim 1, wherein said hydrogenated block copolymer contains from 15 to 60% by weight of a repeating unit derived from the aromatic vinyl compound.

9. A thermoplastic resin composition as claimed in claim 1, wherein said block (B) in the hydrogenated block copolymer has a degree of unsaturation reduced to 20% or less based on the initial degree before hydrogenation.

10. A thermoplastic resin composition as claimed in claim 1, wherein said modified block copolymer has a toluene solution viscosity at 25° C. in the range of from 30 to 3,000 cps at a concentration of 15% by weight or from 50 to 10,000 cps at a concentration of 20% by weight.

11. A thermoplastic resin composition as claimed in claim 1, wherein said modified block copolymer has the epoxy value of from 0.007 to 0.35.

12. A thermoplastic resin composition as claimed in claim 1, wherein said modified block copolymer has the epoxy value of from 0.01 to 0.2.

13. A thermoplastic resin composition as claimed in claim 1, wherein the component (b) is present in an amount of from 10 to 95% by weight based on the total amount of the components (a) and (b).

14. A thermoplastic resin composition as claimed in claim 1, wherein the component (b) is present in an amount of from 20 to 90% by weight based on the total amount of the components (a) and (b).

15. A thermoplastic resin composition as claimed in claim 1, wherein the component (b) is present in an amount of from 25 to 85% by weight based on the total amount of the components (a) and (b).

16. A thermoplastic resin composition as claimed in claim 1, wherein the component (c) is present in an amount of from 5 to 50 parts by weight per 100 parts by weight of the total amount of the components (a) and (b).

17. A thermoplastic resin composition as claimed in claim 1, wherein the component (c) is present in an amount of from 10 to 30 parts by weight per 100 parts by weight of the total amount of the components (a) and (b).

18. The thermoplastic resin composition as claimed in claim 1, wherein said component (b) is polyethylene terephthalate, and said component (c) is a hydrogenated styrene/butadiene block copolymer to which glycidyl methacrylate is grafted.

19. A thermoplastic resin composition as claimed in claim 1, wherein said polar thermoplastic resin has a polar functional group selected from the group consisting of an amino group, a hydroxyl group, a carboxyl group or the salt thereof, a carboxylic acid anhydride group, a mercapto group, a urethane group, an ester group, an amido group and an ammonium group.

20. A thermoplastic resin composition as claimed in claim 1, wherein said polar thermoplastic resin having a polar functional group is a polar thermoplastic resin having an ester group.

21. A thermoplastic resin composition as claimed in claim 1, wherein said polar thermoplastic resin having a polar functional group is polyethylene terephthalate.

* * * * *